(12) United States Patent
Mitchell

(10) Patent No.: US 7,934,706 B2
(45) Date of Patent: May 3, 2011

(54) AERATION DEVICE FOR USE AS A DIFFUSER

(75) Inventor: William S. Mitchell, McKenzie, TN (US)

(73) Assignee: Tekni-Plex, Inc., King of Prussia, PA (US)

( * ) Notice: Subject to any disclaimer, the term of this patent is extended or adjusted under 35 U.S.C. 154(b) by 1033 days.

(21) Appl. No.: 11/800,440

(22) Filed: May 4, 2007

(65) Prior Publication Data

US 2007/0257382 A1    Nov. 8, 2007

Related U.S. Application Data

(60) Provisional application No. 60/798,611, filed on May 8, 2006.

(51) Int. Cl.
*B01F 3/04* (2006.01)
(52) U.S. Cl. .................................... 261/122.1
(58) Field of Classification Search ............... 261/122.1, 261/122.2, 123
See application file for complete search history.

(56) References Cited

U.S. PATENT DOCUMENTS

| | | | |
|---|---|---|---|
| 3,677,936 A | 7/1972 | Bastiaanse | |
| 3,857,910 A * | 12/1974 | Day | 261/65 |
| 3,880,965 A | 4/1975 | Dudis et al. | |
| 3,977,606 A * | 8/1976 | Wyss | 239/145 |
| 4,060,486 A * | 11/1977 | Schreiber | 210/220 |
| 4,118,447 A * | 10/1978 | Richter | 261/122.1 |
| 4,165,286 A * | 8/1979 | Schreiber et al. | 210/220 |
| 4,215,082 A | 7/1980 | Danel | |
| 4,273,731 A | 6/1981 | Laurie et al. | |
| 4,379,750 A | 4/1983 | Tiggelbeck | |
| 4,581,137 A | 4/1986 | Edwards et al. | |
| 4,929,397 A | 5/1990 | Jäger | |
| 4,960,546 A * | 10/1990 | Tharp | 261/122.1 |
| 5,059,358 A * | 10/1991 | Tharp | 261/122.2 |
| 5,811,164 A | 9/1998 | Mitchell | |
| 6,367,784 B1 | 4/2002 | Jäger | |
| 6,619,633 B2 * | 9/2003 | Jager et al. | 261/122.2 |
| 6,702,263 B2 * | 3/2004 | Kelly | 261/122.1 |
| 7,044,453 B2 * | 5/2006 | Tharp | 261/122.1 |
| 2004/0094849 A1 * | 5/2004 | Jager | 261/122.1 |

FOREIGN PATENT DOCUMENTS

| | | |
|---|---|---|
| DE | 27 49 600 | 5/1979 |
| DE | 3418548 A1 * | 11/1985 |
| DE | 3508593 A1 * | 9/1986 |
| DE | 3536507 A1 * | 4/1987 |
| GB | 1 229 856 | 4/1971 |

* cited by examiner

*Primary Examiner* — Scott Bushey
(74) *Attorney, Agent, or Firm* — Rissman Hendricks & Oliverio, LLP

(57) ABSTRACT

An aeration device or diffuser is disclosed. The diffuser preferably includes a porous hose adapted to allow gas to escape therefrom, a rigid element disposed within the hose, the rigid element being constructed of material denser than water and a fitting suitable for attaching the hose to an air supply, the fitting disposed within the hose at one end of the hose. Methods of use of the diffuser and of assembling the diffuser are also disclosed.

19 Claims, 5 Drawing Sheets ed of a material denser than water. In such embodiments, the rigid element may include a metal, such as brass.

AERATION DEVICE FOR USE AS A DIFFUSER

CROSS-REFERENCE TO RELATED APPLICATIONS

This application claims the benefit of the filing date of U.S. Provisional Patent Application No. 60/798,611 filed May 8, 2006, the disclosure of which is hereby incorporated herein by reference.

BACKGROUND OF THE INVENTION

The present invention relates to aeration devices, and more particularly to aeration devices or diffusers for use in aquariums and the like.

The field of aquaculture is very popular these days. Not only are there many households in the United States and worldwide which include one or more aquariums or fish tanks, many commercial businesses proudly display similar, if not larger, displays. The collecting of fish, shellfish and other water life in such displays has become a multi-million dollar business, and one in which size and variety often separates the extraordinary from the ordinary.

Typically, fish and other aquatic life which are ultimately kept in the aforementioned aquariums are raised in large tanks. Such tanks may hold as much as ten thousand gallons of water and are often housed along with several other similar tanks in large warehouses or the like. Depending upon the type of aquatic life being raised, the size of these tanks may vary. For example, for larger fish, such tanks may approach the aforementioned ten thousand gallon size (or even larger), while smaller fish may be raised in proportionately smaller tanks. Aquatic life raising facilities may include upwards of thirty to forty of these raising tanks, and have the ability to raise many different types of species of aquatic life.

The larger the aquarium, other display or aquatic life raising tank, generally the more upkeep and maintenance is required. In addition to the standard testing, cleaning and changing of water, larger enclosures often require the injection of oxygen or other gases into its waters. This typically aids in the cultivation of the various wildlife therein, as well as in the improvement of the overall beauty of the display. Heretofore, the most commonly utilized apparatus for aerating the waters of a fish tank or the like is generally referred to as an airstone. Essentially, an airstone is constructed of a material like silica glass, and is designed to inject oxygen/air through openings in its structure. Large tanks often employ more than one airstone, and sometimes hundreds or more. For aquarium displays, airstones are often colored and/or shaped to fit a particular aesthetic. In addition, a particular airstone may also be designed to infuse the gas in a particular aesthetically pleasing and efficient stream, the latter is specifically important in larger tanks. However, such apparatus exhibit several disadvantages which, if improved, could benefit the aquaculture industry.

For example, airstones are typically expensive, both in manufacturing and commercially. Thus, they are a monetary burden not only to the end purchaser, but also to the company manufacturing them. In addition, airstones have historically exhibited properties which tend to lower their overall durability. In fact, airstones are known to easily clog and therefore require a cleaning process, which typically requires the airstone to be periodically removed from operation and soaked in a solution of muriatic acid or other suitable cleaning agent. For tanks employing many such apparatus, this can become significantly expensive. Additionally, during this cleaning, the stones are often likely to break or otherwise become damaged. This is due to their overall fragile design. Finally, placing an airstone within an aquarium and/or tank is often difficult, especially when more than one aeration device is required. Achieving the perfect aesthetically pleasing position for an airstone, while allowing for good operation of the apparatus often poses a challenge to the average person.

There have been other apparatus proposed for use mainly in larger bodies of water, such as ponds, lakes, reservoirs, and even sewage tanks. For example, U.S. Pat. Nos. 3,677,936, 3,880,965, 4,215,082, 4,581,137, 4,929,397 and 6,367,784, the disclosures of which are hereby incorporated by reference herein, disclose and teach apparatus suitable for such use. However, the apparatus taught in those references are clearly directed to aeration devices for use on a much larger scale than that of a household fish tank or even aquatic life raising tanks. In many cases, the particular components of the devices taught in the aforementioned patents would not fit or even properly aerate a tank like those for which the present invention is directed.

Therefore, there exists a need for a less expensive, more durable, easier to clean and easier to install apparatus for aerating aquariums and other fish tanks.

SUMMARY OF THE INVENTION

In accordance with the present invention, a diffuser has been invented for use in a water filled tank. The diffuser preferably includes a porous hose adapted to allow gas to escape therefrom, wherein the hose has a gas permeable wall of thermoset polymer particles and thermoplastic binder in a minor amount thereby bonding said polymer particles and creating a substantially uniform porosity through the hose wall along the length of the hose. In addition, the diffuser preferably also includes a rigid element disposed within the hose, the rigid element being constructed of material denser than water, and a fitting suitable for attaching the hose to an air supply, the fitting disposed within the hose at one end of the hose. In certain other embodiments of the first aspect, the diffuser may also include a plug disposed within the hose at the other end of the hose.

In some embodiments, the hose may be of a particular construction. For example, the hose may have a porosity provided by a plurality of micropores having an average diameter of about 0.001 inch to about 0.1 inch, and a preferred range of between 0.001 inch to about 0.004 inch, along the length of the hose for diffusion of gas therethrough and transfer to a medium, the thermoset polymer particles having a mesh size of about 10 to about 200 mesh. In certain preferred embodiments, the mesh size may be about 80 to 100 mesh. Also, the micropores may be irregularly sized and range from about 0.001 inch to about 0.004 inch in cross-sectional dimension. Further, the permeable wall may have a substantially uniform porosity throughout the wall thickness of the hose, and/or greater than 90% uniform porosity along the length of the hose. In certain embodiments, the hose may include approximately 70% to 90% by weight rubber particles and approximately 10% to 30% by weight thermoplastic binder, and more particularly, approximately 80% by weight rubber particles and 20% by weight thermoplastic binder. Finally, the thermoplastic binder may be polyethylene, and specifically linear low density polyethylene. However, other materials may be utilized, including any pliable thermosetting polymer, but preferably styrene-butadiene rubber and ethylene-propylene-diene-methylene.

Still further, in certain embodiments, the rigid element may be sized and shaped to fit within an interior of the hose, and be dimensionally smaller than the interior of the hose. In addition, such may be constructed of stainless steel or any other material which exhibits non-corrosive properties (especially with regard to water) and is heavy enough to keep the diffuser from floating, such as lead, for example. The diffuser may also include at least one clamp for clamping the fitting in place and a supply of gas connected to the fitting. Preferably, the hose, rigid element and fitting of the diffuser are tubular shaped.

DETAILED DESCRIPTION

Figure 1:
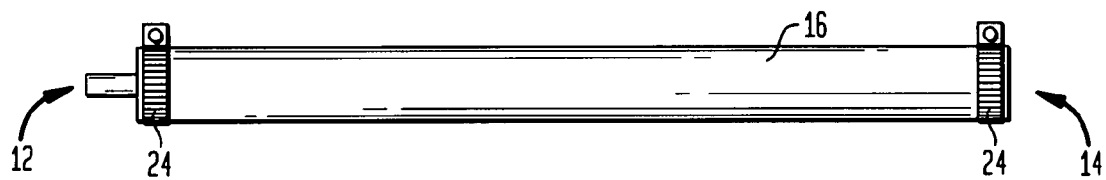
FIG. 1 is a side perspective view of a fully constructed diffuser in accordance with the present invention.
Figure 2:
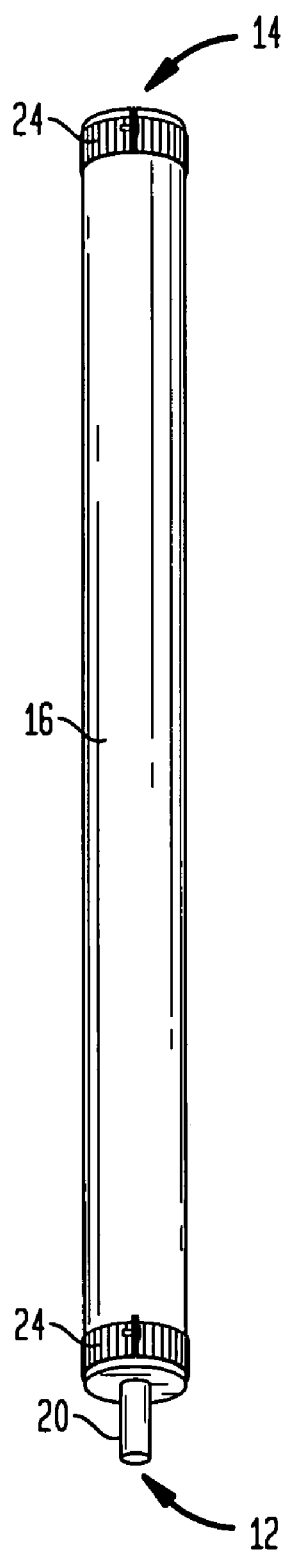
FIG. 2 is a front perspective view of the fully constructed diffuser shown in FIG. 1.
Figure 3:
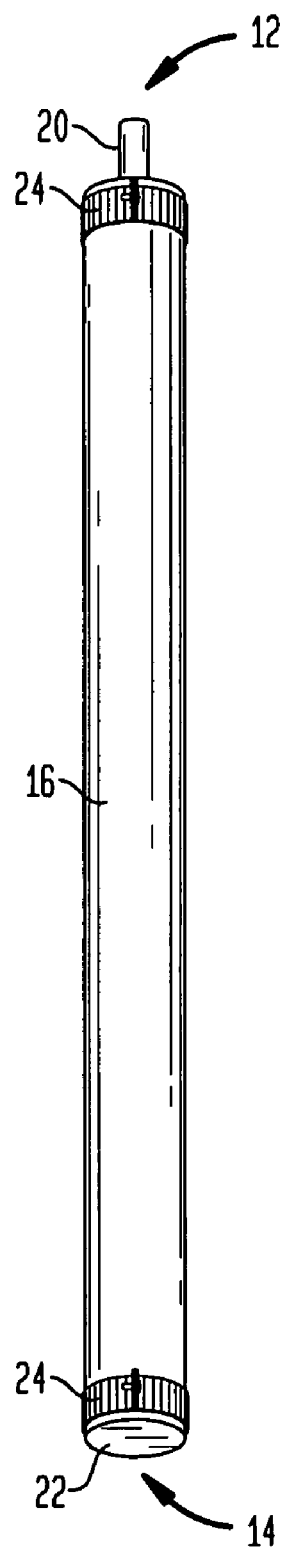
FIG. 3 is a rear perspective view of the fully constructed diffuser shown in FIG. 1.

Referring to the drawings, wherein like reference numerals represent like elements, there is shown in FIGS. 1-5 an aeration device or diffuser designated throughout by reference numeral 10. Essentially, diffuser 10 is designed to convey oxygen or other inert gases into a water filled enclosure, such as an aquarium or tank. As is best shown in FIGS. 1-3, diffuser 10 is a tubular elongated structure having an open end 12 and a closed end 14. These ends are more precisely shown in FIGS. 2 and 3. In preferred embodiments, diffuser 10 has a circular cross section with a diameter of approximately one (1) inch, and is approximately six (6) to twenty four (24) inches between open and closed ends 12 and 14. However, it is noted that diffuser 10 may be of any shape and size, in both length and width, for instance, diffuser 10 may be anywhere from one (1) inch to twenty (20) feet in length. As will be more fully discussed below, the size and shape of diffuser 10 may relate to its ultimate use. For instance, the larger the aquarium or tank, the larger dimensioned diffuser 10 may be required. In addition, the coloring and overall appearance of the device may vary for aesthetic purposes or to otherwise blend into a particular enclosure.

Figure 4:
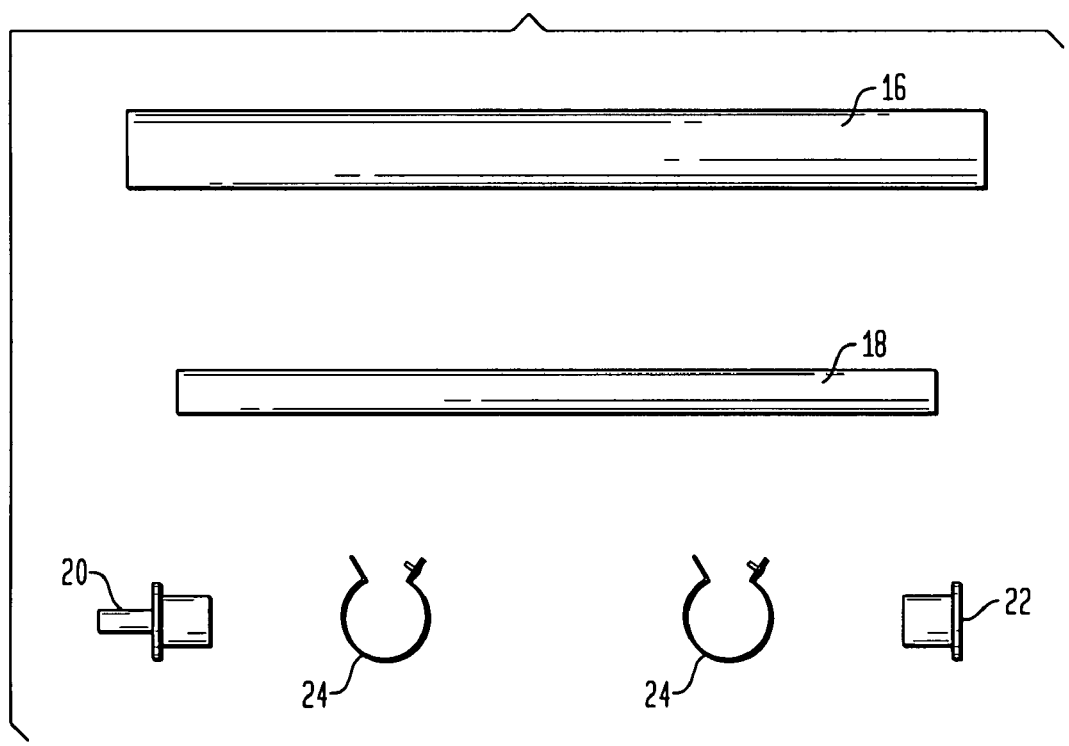
FIG. 4 is an exploded view of the unassembled components of the diffuser of FIG. 1.
Figure 5:
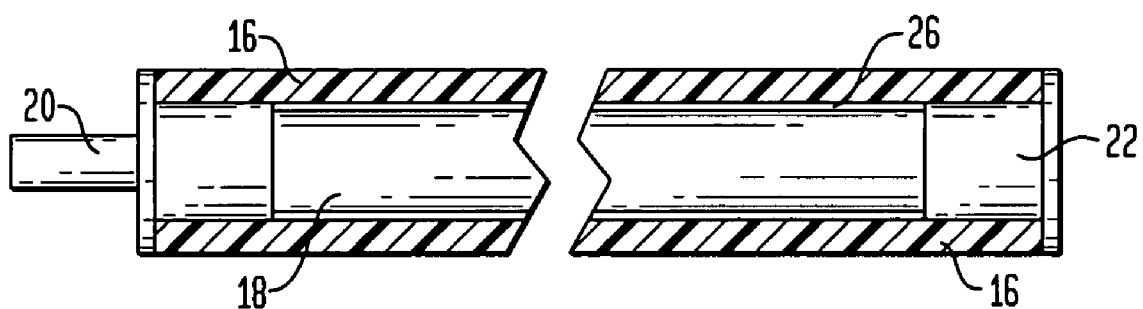
FIG. 5 is a cross sectional view of the diffuser of FIG. 1.

As is best shown in FIGS. 4 and 5, one embodiment of diffuser 10 includes an aeration hose 16, a solid elongated rod 18, an air supply fitting or open connection 20, a closed end connection or plug 22 and at least two clamps 24. Each of these components is preferably designed so as to form the assembled structure shown in FIGS. 1-3, and a description of the assembly process is set forth more fully below. However, it is noted that more, less or even different components may be included in diffuser 10. For example, different clamping devices and connections 20 and 22 may be employed. Those of ordinary skill in the art would recognize the different variations in components upon review of the present specification and appended drawings.

Aeration hose 16 is preferably a tubular structure having a hollow interior 26 (best illustrated in FIG. 5). The particular size and shape of hose 16 may of course vary depending upon the other components being utilized in diffuser 10, as well as according to the ultimate use for the device. A suitable hose 16 preferably includes a porous structure which exhibits good aeration properties. In other words, a structure in which oxygen or other gas introduced into the aforementioned hollow interior 26 is allowed to exit, preferably in a uniform fashion along its length and most preferably in order to provide uniform extremely small diameter bubbles. One example of a suitable hose 16 is described in commonly owned U.S. Pat. No. 5,811,164 ("the '164 patent"), the disclosure of which is hereby incorporated by reference herein. Of course, any other suitable hose, which is known in the art, may be utilized in connection with the present invention.

The '164 patent teaches both a suitable aeration hose 16 and the process and apparatus required for manufacturing same. As is noted in the abstract of the '164 patent, the plastic pipe or aeration hose disclosed therein "has a gas permeable wall of thermoset polymer particles and thermoplastic binder for the particles with a substantially uniform plurality of micropores through the wall of about 0.0001 inch to 0.004 inch along its length for diffusion of gas therethrough and transfer to a medium. The thermoset polymer particles have a mesh size of about 10 to about 200 mesh, preferably approximately 80 to 100 mesh." In addition, as is also stated in the abstract of the '164 patent, "the method of manufacture includes volumetric delivery of thermoset polymer particles and thermoplastic binder particles to a mixing chamber for preblending and then controlled volumetric feeding of the preblend into an extruder to form the porous aeration pipe." In all, those of ordinary skill in the art would be provided with enough information upon a review of the '164 patent to construct a suitable hose 16 for use in the present invention. Of course, variations of the invention taught in the '164 patent are also contemplated in connection with the present invention, as are completely different yet still suitable hose designs.

Figure 6:
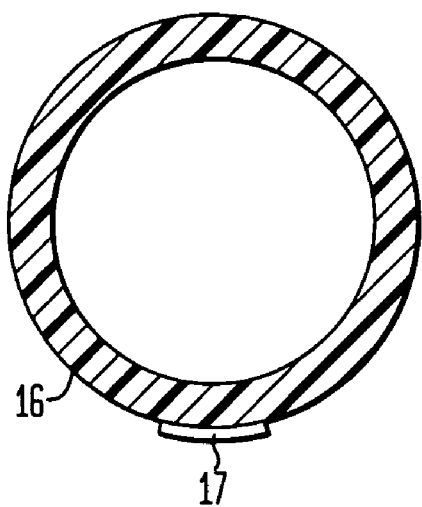
FIG. 6 is a cross sectional view of a hose portion having an air-impermeable stripe formed thereon.

Additionally, a hose of the type described in the '164 patent can be further adapted to include a portion thereof which is air impermeable. Such a portion may be generally in the form of a longitudinal stripe that extends along the length of the hose section. This stripe may be formed from nonporous polymer such as polyethylene, which may be applied to hose 16 during formation thereof using a co-extrusion process. Additional materials which can be used to form stripe 17 are polyvinylchloride, ABS and polypropylene. Alternatively, the stripes may be applied by re-melting the porous polymer of the hose itself by the application of a hot iron or the like having the appropriate shape and size to re-melt the polymer at the location where the nonporous stripe is desired. Further, a latex or similar material may be applied after formation of hose 16 by painting. The air impermeable stripe is preferably of a width between 0.10 and 1 inch, preferably from about 0.125 to 0.25 inches, and is more preferably about 0.25 inches in width. In terms of the lateral circumference of the hose, the impermeable stripe can vary from about 1% to 50% of the entire circumference, but preferably is from about 4% to 8% thereof. When a hose of this type, having an air impermeable stripe formed thereon is used in a device of the present invention, the stripe should be oriented in a downward direction with respect to the remaining hose (as shown in FIG. 6), in order to be in contact with the ground, or bottom surface of the tank or aquarium in which it is utilized.

Additionally, the air impermeable stripe 37 can be positioned in an offset fashion, as illustrated in FIG. 5b. In such an arrangement, stripe 37 is preferably positioned at a point offset from the bottom of the hose by between 5 and 45 degrees in either direction. By doing so, the hose can provide for additional directional flow of the liquid medium. For example, as illustrated in FIG. 5b, stripe 37 is directed toward the back 22 of the device. This results in a greater proportion of air bubbles being produced on the front portion of the hose, as compared to the back portion thereof, which tends to direct the liquid toward the front of the device and tends to draw more of the liquid from the rear of the device.

Rod 18 is preferably a solid structure with a shape complementary to hollow interior 26 of hose 16. For example, rod 18 (as shown in the figures) is tubular shaped to cooperate with the like shaped interior 26. As is best shown in the cross sectional view of FIG. 5, rod 18 is preferably sized and shaped so that when it is disposed within hollow interior 26, there remains a small unoccupied portion of interior 26, both in the length and width dimensions. In other words, rod 18 is preferably sized and shaped to encompass only a portion of hollow interior 26, and should not fill more than up to 90% of the interior thereof. This is important in the operation of diffuser 10, and will be discussed more fully below. Although there is no particular preferred dimension for the unoccupied portion of interior 26, such should be large enough so that it does not restrict airflow therethrough. In addition, rod 18 is preferably constructed from a material which exhibits rigid properties, and provides a dense structure. As such, rod 18 preferably provides rigidity to diffuser 10, while also acting as a ballast to keep diffuser 10 from floating. Of course many suitable materials may be utilized, however, in a preferred embodiment, rod 18 is constructed of stainless steel. Such material not only provides the required rigidity and density properties, but also is a material suitable for extended periods of being submerged in water, including either fresh water or salt water. However, once again, other materials are contemplated for the construction of rod 18.

Air supply fitting 20 is preferably designed to allow connection between diffuser 10 and an air supply, and to allow introduction of oxygen or other gas into hollow interior 26 of hose 16. For example, as is shown in the figures, fitting 20 is a straight fitting having ribs which are typically utilized in connecting two pieces of rubber hose. This design provides for a strong, non-leaking connection with hose 16, and given that a solid rubber hose or the like is often the gateway to the air supply, a similar strong, non-leaking connection with the air supply. Preferably, fitting 20 is sized and shaped so as to require forceable insertion into interior 26 of hose 16. This increases the aforementioned substantially air-tight connection. It is noted that although shown as a straight fitting, many different types of fittings may be utilized in connection with diffuser 10. For example, it is contemplated to utilize a fitting having a barbed outside, as well as fittings employing different shapes, such as curved, L-shaped T-shaped configurations or the like.

Plug 22 is similar in structure to that of fitting 20, but includes a closed structure which ultimately seals one end of hose 16. Like fitting 20, plug 22 is preferably configured so as to complement the size and shape of interior 26 of hose 16, and require forceable insertion therein. This, once again, preferably creates an air tight connection. Although shown in the drawings as being constructed of a circular cross section, it is noted that plug 22 may vary according to like variations in hose 16. In addition, plug 22 may be alternatively designed as an air tight cap which fits over the exterior of one end of hose 16 and provides an identical air tight function. Of course, plug 22 could also be constructed in many other different fashions to provide the same function. Finally, hose 16 could itself be constructed to have a closed end, which would negate the necessity of having a plug 22 or the like.

Clamps 24 are the final components of diffuser 10 shown in the figures. Essentially, clamps 24 are designed to create or otherwise ensure the air tight connection between hose 16 and fitting 20 and plug 22. As discussed above, fitting 20 and plug 22 are preferably designed so as to require forceable insertion into interior 26 of hose 16, thereby creating substantially air tight connections. In such case, clamps 24 are preferably designed so as to ensure that such components remain within hose 16. However, it is also contemplated to provide clamps 24 which, when actuated, force hose 16 tightly around fitting 20 and plug 22. This would be preferential in cases where fitting 20 and plug 22 are constructed smaller than interior 26 of hose 16. Whatever the case, clamps 24 are preferably designed so that they can be easily slid over the exterior of hose 16 and thereafter clamped or otherwise actuated into a snug engagement with the hose. This preferably provides a clamping pressure on hose 16 that acts to hold fitting 20 and plug 22 in place. The particular clamps depicted in the drawings require the use of a tool to cause them to clamp down on hose 16, but other, more easily actuated clamps are clearly envisioned. Those of ordinary skill in the art would recognize the many different clips which may be employed.

The assembly of diffuser 10 may be readily carried out either by hand or through an automated process. Although it is noted that production of the hose 16, as discussed in the '164 patent, is a separate process in and of itself. Once a hose 16 is provided, rod 18 is first preferably inserted into interior 26. Thereafter, both fitting 20 and plug 22 are preferably placed into interior 26 on either side of hose 16. This captures rod 18 within interior 26, so that it can no longer be removed therefrom. Finally, clamps 24 are preferably placed over the exterior of hose 16 in regions corresponding to where fitting 20 and plug 22 are inserted. A tool may be utilized to actuate clamps 24 and cause same to clamp down upon the exterior of hose 16. However, this may not be necessary depending upon the type of clamp being employed.

Once assembled, an easy to clean and install, and extremely durable aeration device is provided in the form of diffuser 10. In fact, it is noted that, subsequent to use, diffuser 10 may be cleaned by simply rinsing same with water. This is much easier than that which is required in the cleaning of an airstone or the like. In addition, it is noted that the flexibility of hose 16, coupled with the rigidity added by rod 18 provides for a relatively durable construction. The flexibility of hose 16 typically provides for an exterior which may not easily be chipped or otherwise broken, and the rigidity of rod 18 provides for an apparatus which is easy to manipulate and place during installation.

It is noted that the construction of diffuser 10 is such that it may easily be attached to an air supply, such as a pump or other gas infusing apparatus. In short, such a supply may simply be attached to fitting 20 by a rubber hose or the like. Of course, diffuser 10 and a suitable air supply may be attached in many other fashions. Once properly hooked up, diffuser 10 may easily be placed at the bottom of a water tank. Rod 18 preferably provides the necessary ballast to keep diffuser 10 in place, and the preferably flexible connection between diffuser 10 and a suitable air supply does not prevent easy placement. Subsequent to placement of diffuser 10, rocks or the like may be place around, or in some cases, even over and covering the apparatus. This may improve the overall aesthetics of the tank as a whole. In addition, as is briefly mentioned above, diffuser 10 may be colored and or size and configured in order to better match the aesthetics of a particular tank. Clearly, diffuser 10 must be sized large enough to provide suitable aeration to the particular tank, but once determined such may be matched accordingly. In addition, hose 16, fitting 20, plug 22 and clamps 24 may be colored so as to better match the coloring of the particular tank in question. For example, for tanks with sand or lightly colored rocks, such components may be lightly colored. As is briefly mentioned above in the background section, larger tanks may ultimately employ more than one diffuser 10, and upwards of hundreds of such apparatus, depending upon their overall size. In addition, it is noted that diffuser 10 need not be of a straight configuration. Diffuser 10 may be curved and/or bent in some cases in order to fit specific tanks or to create certain aeration schemes. For example, it is contemplated to provide an otherwise rounded diffuser 10 for use in a septic tank or the like for the aeration of wastewater.

In operation, oxygen or other gas may simply be injected into interior 26 through fitting 20. As mentioned above, this may be supplied by any suitable supply apparatus, and may be carried to fitting 20 through any suitable medium, such as a rubber hose. Once in interior 26, the porous nature of hose 16 allows the air to escape therefrom. In this regard, the fact that rod 18 is sized slightly smaller than interior 26 allows air supplied to interior 26 to matriculate along the length of hose 16 and thus be expelled in a similar area of the length. Hence, diffuser 10 provides a simple and easy manufacture and use device suitable for aerating the interior of a water filled tank such as an aquarium.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A diffuser for use in a water filled tank comprising:
   a predetermined length of flexible tubular porous hose, the hose having a hollow tubular interior space and a gas permeable wall adapted to allow gas to escape from the interior space through the wall, said gas permeable wall having a substantially uniform porosity along the length of said hose provided by a plurality of micropores having an average diameter of from about 0.001 inch to about 0.01 inch of thermoset polymer particles and thermoplastic binder in a minor amount thereby bonding said polymer particles;
   a fitting suitable for attaching said hose to an air supply, the fitting disposed at one end of said hose;
   a closed end fitting disposed at the other end of the hose; and
   a rigid elongated ballast element freely disposed within the hollow tubular space and not connected to the fittings to provide an unoccupied portion of the tubular cross section of the hose for airflow therethrough.

2. The diffuser of claim 1, wherein the closed end fitting comprises a plug.

3. The diffuser of claim 1, wherein said plurality of micropores have an average diameter of about 0.001 inch to about 0.004 inch along the length of said hose.

4. The diffuser of claim 3, wherein said thermoset polymer particles have a mesh size of about 10 to 200 mesh.

5. The diffuser of claim 3, wherein the micropores are irregularly sized and range from about 0.001 inch to about 0.004 inch in cross-sectional dimension.

6. The diffuser of claim 3, wherein the permeable wall has a substantially uniform porosity throughout the wall thickness of the hose.

7. The diffuser of claim 6, wherein the permeable wall has a greater than 90% uniform porosity along the length of the hose.

8. The diffuser of claim 3, wherein the hose comprises approximately 70% to 90% by weight rubber particles and approximately 10% to 30% by weight thermoplastic binder.

9. The diffuser of claim 8, wherein the hose comprises approximately 80% by weight rubber particles and 20% by weight thermoplastic binder.

10. The diffuser of claim 8, wherein the thermoplastic binder is polyethylene.

11. The diffuser of claim 10, wherein the polyethylene binder is linear low density polyethylene.

12. The diffuser of claim 1, wherein the rigid element is a solid rod.

13. The diffuser of claim 1, wherein the rigid element is straight, curved or bent.

14. The diffuser of claim 13, wherein the rigid element is constructed of stainless steel.

15. The diffuser of claim 13, further comprising at least one clamp for clamping at least one of the fittings in place.

16. The diffuser of claim 1, further comprising a supply of gas connected to the fitting at the one end of the hose.

17. The diffuser of claim 1, wherein the rigid element and fitting are tubular shaped.

18. The diffuser of claim 1, wherein the hose includes an air-impermeable portion extending in a longitudinal direction along a length thereof.

19. The diffuser of claim 18, wherein said air-impermeable portion is in the form of a stripe having a width between about 0.10 inches to 1 inch.

* * * * *